Patented May 25, 1926.

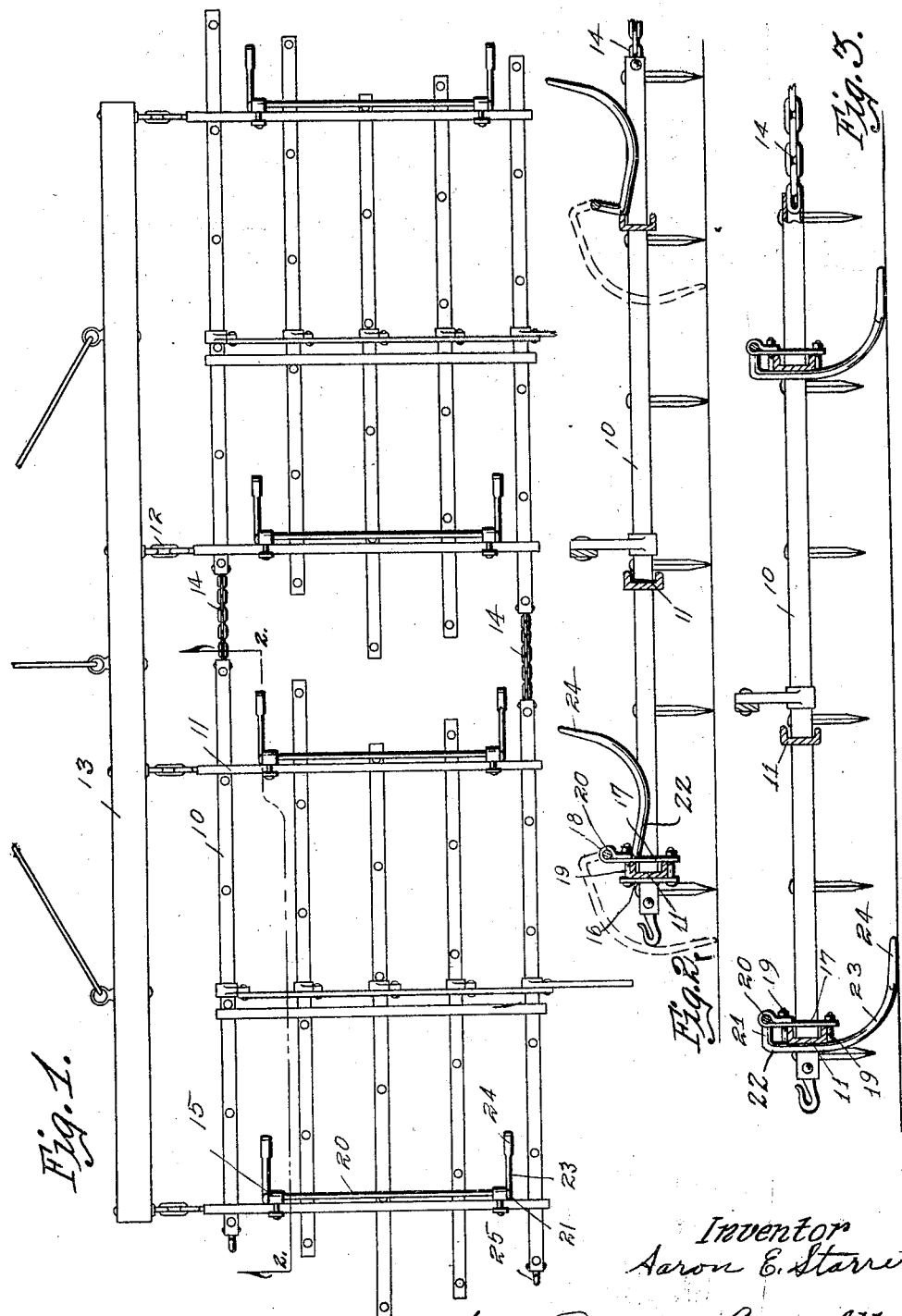

1,586,225

UNITED STATES PATENT OFFICE.

AARON E. STARRETT, OF NEWTON, IOWA.

HARROW ATTACHMENT.

Application filed July 6, 1925. Serial No. 41,678.

The object of my invention is to provide a device in the nature of an attachment for harrows, whereby a horrow of considerable length may be easily and quickly transported from one position to another. It has been customary heretofore to load the harrows on some kind of a skid or wagon when it is desired to move them from one field to another, as the harrow as operated in the field is of considerably greater width than the gates through which it has to pass or the bridges over which it has to cross.

It is, therefore, more specifically the object of my invention to provide a device which may be easily and quickly applied to harrows of various makes, and when so applied may be moved to position whereby the harrow may be elevated and lifted from the ground and transported from one point to another by moving the harrow endways.

A further object is to provide a skid attachment for harrows which may be easily and quickly applied and adapted to be thrown to an inoperative position while the harrow is in use, and when it is desired to move the harrow from one position to another the device may be quickly thrown into operative position, after which the harrow is elevated above the ground by draft animals or a tractor moving the harrow.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a plan view of a harrow showing the manner in which my improved device is attached thereto.

Figure 2 is a detail sectional view on the line 2—2 of Figure 1, showing my device moved to an inoperative position and the harrow in an operative position.

Figure 3 is taken on the section line 2—2 of Figure 1, showing my improved device in an operative position with the harrow elevated above the ground surface.

The numeral 10 indicates the toothed bars of a harrow section, which is of common construction. Said toothed bars are pivotally mounted in transversely arranged bars 11. The forward ends of the bars 11 are provided with links 12 which are connected to the draw bar 13. The draw bar 13 may be of any desired length and any number of sections may be attached to the draw bar. In Figure 1, I have illustrated two sections, said sections being connected together by means of chains 14 connected to the front and back toothed bars 10. This permits the sections to have free and independent up and down movement relative to each other, and a certain amount of longitudinal movement relative to each other, due to the slack of the chains. The chains 14, however, are of such length that when drawn taut the bars 11 of one section will be substantially parallel with the bars 11 of an adjacent section.

Each of the bars 11 is provided with a pair of clamping members 15 which comprise a short vertically arranged bar 16 and a longer vertical bar 17. The bar 17 has at its upper end a loop portion 18. The said bars 16 and 17 are arranged on opposite sides of the bar 11 and secured together by means of bolts 19. The loops 18 are designed to pivotally carry a rod 20, each end of which is provided with a laterally extending portion 21 which terminates in a right angle portion 22, which in turn terminates in a curved portion 23. The free end of the curved portion 23 is flattened at 24 to serve as a runner.

When the harrow is being operated the members 24 are thrown to the position shown in Figure 2 with said members extending upwardly, and the member 21 resting against the member 11. When it is desired to move the harrow from one position to another, the team or tractor is disconnected from the draw bar 13 and the said draw bar folded to position over the forward end of the bars 11, after which the tractor or draft animals are attached to the hooks 25 at one end of the outer one of the harrow sections. The members 24 are then rotated to the position shown in dotted lines in Figure 2, after which forward movement to the left is imparted to the harrow, which will cause the members 24 to be rotated to the position shown in Figure 3, and the toothed bars elevated from the ground, after which the harrow may be moved to any position, either through gates or over bridges. The total width of the harrow is less than five feet. The chains 14 serve to connect the back section to the forward section, and provide means for moving said back sections endways.

Thus it will be seen I have provided an attachment for harrows which may be easily and quickly applied to most of the harrows in common use with the use of a wrench, and when so applied will obviate the necessity of loading the harrow onto some vehicle when it is desired to move it from one position to another.

I claim as my invention:

1. A harrow attachment comprising a pair of clamping members, a shaft rotatively mounted therein, said shaft being provided with a pair of runners mounted in planes transverse to said shaft.

2. In combination, a harrow section having toothed bars and connecting bars, a pair of clamps for one of said connecting bars, a shaft rotatively mounted parallel with said connecting bars, said shaft being provided with laterally extending portions, said laterally extending portions terminating in runners, said runners being adapted to swing from a position beneath the harrow to a position above it, substantially as described and for the purposes stated.

3. In combination, a harrow section having toothed bars and connecting bars, a pair of clamps for one of said connecting bars, a shaft rotatively mounted parallel with said connecting bars, said shaft being provided with laterally extending portions, said laterally extending portions terminating in runners, said runners being adapted to swing from a position beneath the harrow to a position above it, and flexible means for connecting the ends of two of said harrow sections together.

4. In combination, a harrow section having a number of toothed bars and connecting bars, means capable of being thrown from an inoperative to an operative position, and adapted to automatically elevate the harrow above the ground surface when thrown to said operative position and when the said harrow is moved endways in one direction.

5. A harrow attachment comprising a pair of clamping members, each of which comprises a short bar and a longer bar, the longer bar being provided with a loop, a shaft rotatively mounted in said members, said shaft being provided with a laterally extending portion, said laterally extending portion terminating in a right angle portion, said right angle portion terminating in a curved portion, and said curved portion terminating in a flattened portion, and clamping bolts for said bars.

Des Moines, Iowa, June 19, 1925.

AARON E. STARRETT.